(12) United States Patent
Verma et al.

(10) Patent No.: US 10,354,027 B1
(45) Date of Patent: Jul. 16, 2019

(54) SYSTEMS AND METHODS FOR HEAT TRANSFER SIMULATIONS

(71) Applicant: Ansys, Inc., Canonsburg, PA (US)

(72) Inventors: Atul Kumar Verma, Pune (IN); Sudhanshu Kishore Prasad, Pune (IN)

(73) Assignee: Ansys, Inc., Canonsburg, PA (US)

( * ) Notice: Subject to any disclaimer, the term of this patent is extended or adjusted under 35 U.S.C. 154(b) by 275 days.

(21) Appl. No.: 15/203,941

(22) Filed: Jul. 7, 2016

Related U.S. Application Data (60) Provisional application No. 62/190,527, filed on Jul. 9, 2015.

(51) Int. Cl.
*G06F 17/50* (2006.01)

(52) U.S. Cl.
CPC .................. *G06F 17/5009* (2013.01)

(58) Field of Classification Search
CPC .................................................. G06F 17/5009
USPC ............................................................. 703/7
See application file for complete search history.

(56) References Cited

U.S. PATENT DOCUMENTS

| | | | | |
|---|---|---|---|---|
| 6,611,736 B1* | 8/2003 | Waite | ............... | G06F 17/5018 700/281 |
| 7,024,342 B1* | 4/2006 | Waite | ............... | B22D 17/32 700/118 |
| 7,098,912 B1* | 8/2006 | Borden | ............... | G06F 17/5018 345/421 |
| 7,181,377 B1* | 2/2007 | Borden | ............... | G06T 17/20 345/421 |
| 8,731,869 B2* | 5/2014 | Michal | ............... | G06F 17/5018 345/427 |
| 9,146,652 B1* | 9/2015 | Danielsson | ............... | G06F 3/048 |
| 9,767,235 B2* | 9/2017 | Guedon | ............... | G06F 17/5018 |
| 2002/0033326 A1* | 3/2002 | Dalton | ............... | B01D 53/32 204/157.15 |
| 2003/0144812 A1* | 7/2003 | Shimizu | ............... | G06T 17/20 702/150 |
| 2004/0034514 A1* | 2/2004 | Langemyr | ............... | G06F 17/12 703/2 |
| 2006/0031794 A1* | 2/2006 | Li | ............... | G06F 17/5009 716/111 |
| 2006/0087816 A1* | 4/2006 | Ewes | ............... | F28F 3/02 361/704 |
| 2007/0085227 A1* | 4/2007 | Tonkovich | ............... | B01D 1/14 261/127 |
| 2009/0015586 A1* | 1/2009 | Im | ............... | G06F 17/5018 345/423 |

(Continued)

OTHER PUBLICATIONS

Panahi et al. ("A finite volume algorithm based on overlapping meshes for simulation of hydrodynamic problems", J. Marine. Sci. Appl. (2009) 8: 281-290).*

(Continued)

*Primary Examiner* — Kamini S Shah
*Assistant Examiner* — Iftekhar A Khan
(74) *Attorney, Agent, or Firm* — Jones Day (57) ABSTRACT

Systems and methods are provided for heat transfer simulations. Mesh generation is performed for a plurality of regions. Mesh faces are determined on different sides of an interface between the regions and overlapping areas between the determined mesh faces are determined. A total heat flow associated with the interface is discretized based at least in part on the one or more overlapping areas for heat transfer simulations.

19 Claims, 6 Drawing Sheets

(56) References Cited

U.S. PATENT DOCUMENTS

| | | | | |
|---|---|---|---|---|
| 2010/0174515 A1* | 7/2010 | Madhavan | G06F 17/5018 | 703/2 |
| 2010/0204962 A1* | 8/2010 | Choudhary | G06F 17/5004 | 703/1 |
| 2014/0088934 A1* | 3/2014 | Liang | G06F 17/5009 | 703/2 |
| 2014/0278298 A1* | 9/2014 | Maerten | G01V 99/005 | 703/2 |
| 2014/0278333 A1* | 9/2014 | Gupta | H04L 41/145 | 703/18 |
| 2014/0297231 A1* | 10/2014 | Georgescu | G06F 17/5009 | 703/1 |
| 2014/0324399 A1* | 10/2014 | Barron | G06F 17/13 | 703/2 |
| 2014/0365184 A1* | 12/2014 | Walker | G06F 17/5018 | 703/2 |
| 2015/0032420 A1* | 1/2015 | Tristano | G06F 17/5086 | 703/1 |
| 2015/0113379 A1* | 4/2015 | Wakefield | G06F 17/5009 | 715/227 |
| 2015/0242539 A1* | 8/2015 | Tiwari | G06F 17/5095 | 703/2 |
| 2015/0347651 A1* | 12/2015 | Barron | G06F 17/5018 | 703/2 |
| 2016/0321384 A1* | 11/2016 | Pal | G06F 17/5018 | |

OTHER PUBLICATIONS

Murthy et al. ("Finite Volume Method for Radiative Heat Transfer Using Unstructured Meshes", Journal of Thermophysics and heat Transfer, vol. 12, No. 3, 1998).*

Demirdzic et al. (Numerical method for coupled fluid flow, heat transfer and stress analysis using unstructured moving meshes with cells of arbitrary topology, Comput. Methods Appl. Mech. Engrg. 125 (1995) 235-255).*

Clausen et al. (Simulating Liquids and Solid-Liquid Interactions with Lagrangian Meshes, ACM Transactions on Graphics, vol. 32, No. 2, Article 17, 2013.).*

Pacheco et al. (Numerical simulations of heat transfer and uid ow problems using an immersed-boundary finite-volume method on non-staggered grids,2004, Arizona State University).*

Panahi et al. ("A finite volume algorithm based on overlapping meshes for simulation of hydrodynamic problems", J. Marine. Sci. Appl. (2009) 8: 281-290) (Year: 2009).*

Murthy et al. ("Finite Volume Method for Radiative Heat Transfer Using Unstructured Meshes", Journal of Thermophysics and heat Transfer, vol. 12, No. 3, 1998) (Year: 1998).*

Pacheco et al. ("Numerical simulations of heat transfer and fluid flow problems using an immersed-boundary finite-volume method on non-staggered grids", Tempe AZ, 2004, pp. 1-41) (Year: 2004).*

* cited by examiner

SYSTEMS AND METHODS FOR HEAT TRANSFER SIMULATIONS

CROSS-REFERENCE TO RELATED APPLICATIONS

This application claims priority to U.S. Provisional Patent Application No. 62/190,527, filed Jul. 9, 2015, entitled "Systems and Methods for Heat Transfer Simulations," which is incorporated herein by reference in its entirety.

TECHNICAL FIELD

The present disclosure relates generally to the field of computational simulations, and, more specifically, to processor-implemented systems and methods for heat transfer simulations.

BACKGROUND

Heat transfer usually involves energy exchange between two domains of different physical properties (e.g., a solid region and a fluid region, two different solid regions, or two different fluid regions). Heat transfer simulations are very important in many engineering applications. For example, automotive under-hood heat transfer problems often involve conjugate heat transfer analyses between solid and fluid regions. Specifically, the conductive heat transfer in a solid region is often coupled to the convective heat transfer in a neighboring fluid flow. Usually, an interface is created between the solid region and the fluid region to enable modeling transfer of energy, mass, and/or momentum.

The finite-volume method (FVM) is a numerical analysis technique which can be used to represent and evaluate partial differential equations in the form of algebraic equations. Similar to finite element analysis, values are calculated at discrete places on a meshed geometry. A mesh corresponds to a discretization of the geometrical domain and includes a collection of mesh elements. The mesh elements often have simple shapes. For example, zero-dimensional mesh elements include vertices, one-dimensional mesh elements include lines, two-dimensional mesh elements include triangles or quandrangles, and three-dimensional mesh elements include tetrahedra, hexahedra or prisms.

"Finite volume" refers to a small volume surrounding each node point on a mesh. In the finite volume method, volume integrals in a partial differential equation that contains a divergence term are converted to surface integrals, using a divergence theorem. These terms are then evaluated as fluxes at the surfaces of each finite volume.

SUMMARY

As disclosed herein, processor-implemented systems and methods are provided for heat transfer simulations. Mesh generation is performed for a first region and a second region. A first mesh face on one side of an interface between the first region and the second region is determined. One or more second mesh faces on the other side of the interface are determined, the one or more second mesh faces overlapping with the first mesh face. One or more overlapping areas of the one or more second mesh faces corresponding to the first mesh face are determined. The one or more overlapping areas are stored in a non-transitory computer-readable storage medium. A total heat flow associated with the interface is discretized based at least in part on the one or more overlapping areas for heat transfer simulations.

As an example, a processor-implemented system is provided for heat transfer simulations. The system includes: one or more data processors; and one or more computer-readable storage media. The storage media are encoded with instructions for commanding the one or more data processors to execute operations. Mesh generation is performed for a first region and a second region. A first mesh face on one side of an interface between the first region and the second region is determined. One or more second mesh faces on the other side of the interface are determined, the one or more second mesh faces overlapping with the first mesh face. One or more overlapping areas of the one or more second mesh faces corresponding to the first mesh face are determined. The one or more overlapping areas are stored in a non-transitory computer-readable storage medium. A total heat flow associated with the interface is discretized based at least in part on the one or more overlapping areas for heat transfer simulations.

As another example, a computer-readable medium encoded with instructions for commanding one or more data processors to execute operations of a method for heat transfer simulations. Mesh generation is performed for a first region and a second region. A first mesh face on one side of an interface between the first region and the second region is determined. One or more second mesh faces on the other side of the interface are determined, the one or more second mesh faces overlapping with the first mesh face. One or more overlapping areas of the one or more second mesh faces corresponding to the first mesh face are determined. The one or more overlapping areas are stored in a non-transitory computer-readable storage medium. A total heat flow associated with the interface is discretized based at least in part on the one or more overlapping areas for heat transfer simulations.

DETAILED DESCRIPTION

Figure 1:
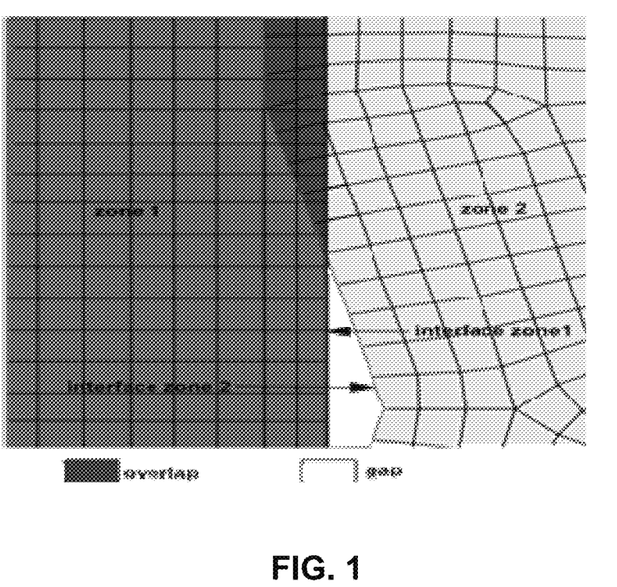
FIG. 1 depicts an example diagram showing gaps and/or penetration exist between mesh interfaces.

Heat transfer simulations usually involve mesh generation for different domains (e.g., a solid region and a fluid region, two different solid regions, or two different fluid regions). Separate meshing continua may be used for different regions for heat transfer analysis. For example, conformal meshes may be generated at an interface between a solid region and a fluid region. The mesh elements on one side of the interface are matched with the mesh elements on the other side of the interface. However, the conformal mesh approach often involves considerable manual efforts and expertise, especially for complex industrial cases (e.g., automotive under-hood applications). Non-conformal meshes at the interface are often preferable for complex industrial cases. However, as shown in FIG. 1, when gaps and/or penetration exist between mesh interfaces, the conventional non-conformal interface approach may not be robust and effective, because the gaps and/or penetration often result in left-handed faces in intersected zones which may adversely affect the overall solution accuracy and convergence of a traditional computational fluid dynamics (CFD) discretization algorithm. In contrast to the conventional non-conformal interface approach, the techniques of the instant disclosure enable a thermal coupling algorithm with non-conformal interfaces for heat transfer simulations that provides high accuracy and fast convergence. It is thus noted that the systems and methods described herein improve the functioning of a computer system as compared to the conventional approaches (e.g., conventional non-conformal interface approaches, as described above), because the techniques described herein enable heat transfer simulations to be carried out (i) more efficiently (e.g., faster), (ii) with a reduced processing burden, and/or (iii) with reduced memory requirements, as compared to the conventional approaches.

Figure 2:
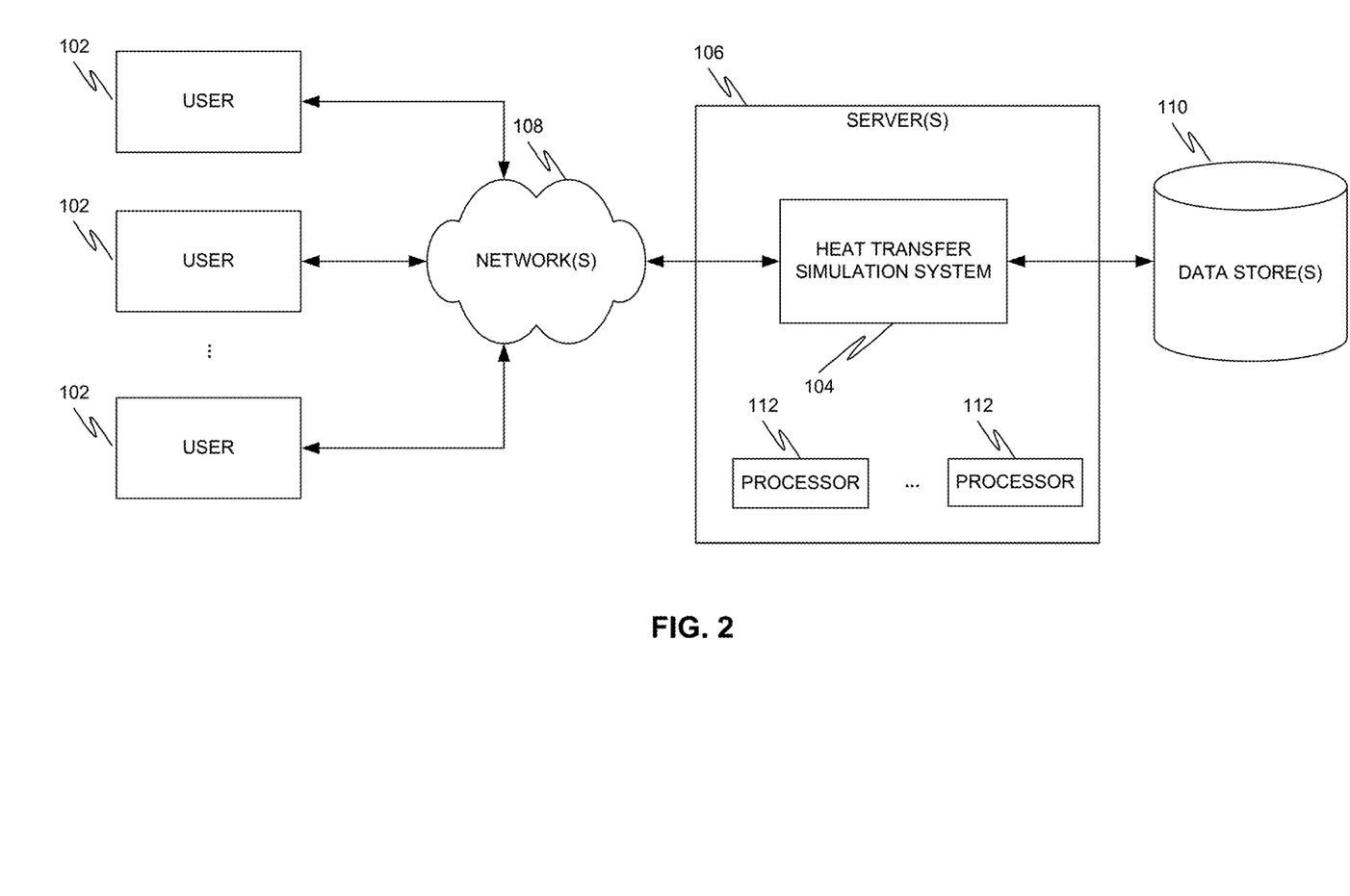
FIG. 2 depicts an example computer-implemented environment wherein users can interact with a heat transfer simulation system hosted on one or more servers through a network.

FIG. 2 depicts an example computer-implemented environment wherein users 102 can interact with a heat transfer simulation system 104 hosted on one or more servers 106 through a network 108. As shown in FIG. 2, the users 102 can interact with the heat transfer simulation system 104 through a number of ways, such as over one or more networks 108. One or more servers 106 accessible through the network(s) 108 can host the heat transfer simulation system 104. The one or more servers 106 can also contain or have access to one or more data stores 110 for storing data for the heat transfer simulation system 104. The one or more servers 106 implement one or more data processors 110. For example, the data processors 110 can be configured for parallel computing.

The heat transfer simulation system 104 can assist the users 102 to implement a thermal coupling algorithm with non-conformal interfaces for heat transfer simulations. Specifically, the heat transfer simulation system 104 assists the users 102 to perform mesh generation for two or more regions, which results in one or more non-conformal interfaces between the two or more regions. The heat transfer simulation system 104 can assist the users 102 to determine a mesh face (e.g., associated with a mesh element) on one side of an interface and prepare a list of mesh faces (e.g., associated with a number of mesh elements) on the other side of the interface. The prepared list of mesh faces overlap with the determined face at one or more overlapping areas. For example, the heat transfer simulation system 104 may implement any known algorithm (e.g., a proximate algorithm) to prepare the list of mesh faces for determining overlapping areas for heat transfer analysis.

Further, the heat transfer simulation system 104 can assist the users 102 to store the overlapping areas in the data stores 110 (e.g., on a computer-readable storage medium). Then, the heat transfer simulation system 104 assists the users 102 to discretize a total diffusive heat flux (e.g., a total heat flow) based at least in part on the overlapping areas and apply the heat conservation law to couple the overall heat flow for heat transfer simulations.

In some embodiments, the heat transfer simulation system 104 receives a user-defined mesh face on one side of an interface and selects a number of mesh faces on the other side of the interface, where the selected faces overlap with the user-defined face. Then, the heat transfer simulation system 104 stores the overlapping areas between the user-defined face and the selected faces and applies the heat conversation law to couple the overall heat flow for heat transfer simulations. In other embodiments, the heat transfer simulation system 104 automatically selects a mesh face on one side of an interface and then determines a list of mesh faces on the other side of the interface, where the determined list of faces overlap with the selected face.

Figure 3:
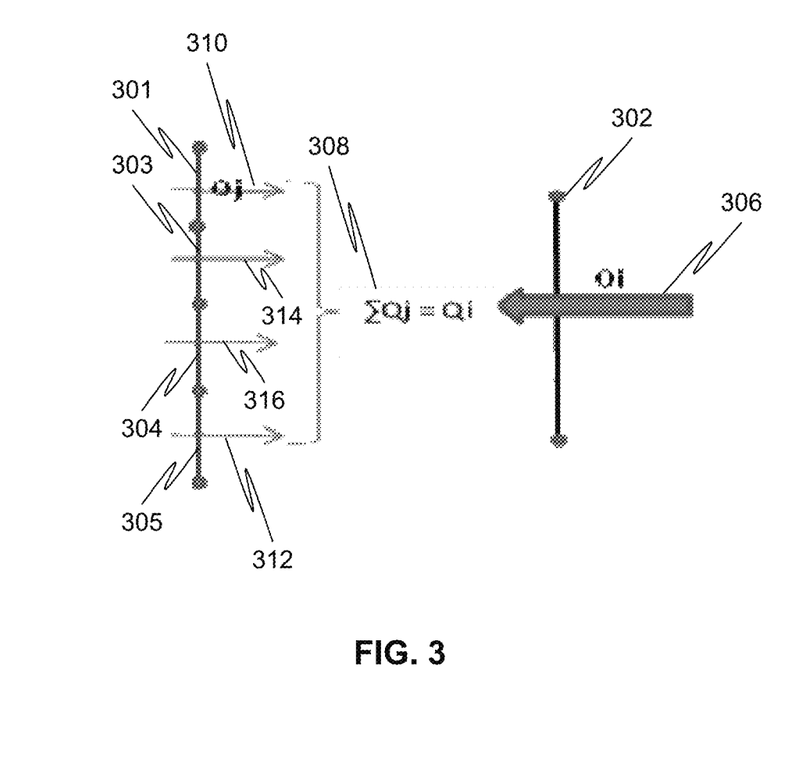
FIG. 3 depicts an example diagram showing heat flows related to an interface between two regions.

FIG. 3 depicts an example diagram showing heat flow related to an interface between two regions. As shown in FIG. 3, a mesh face 302 on one side of an interface between two regions with different physical properties is determined (e.g., user-defined). Then, correspondingly a number of mesh faces (e.g., faces 301, 303, 304 and 305) on the other side of the interface are determined. A total heat flow related to the interface is discretized based at least in part on overlapping areas between the face 302 and the faces 301, 303, 304 and 305 for heat transfer simulations.

Referring to FIG. 2 and FIG. 3, the heat transfer simulation system 104 determines a heat flow 306 associated with the mesh face 302 and another heat flow 308 associated with the overlapping areas between the face 302 and the faces 301, 303, 304 and 305, and then constructs a model for the total heat flow associated with the interface according to heat flow conservation.

Specifically, the heat flow 306 associated with the mesh face 302 is determined as follows:

$$Q_i = (a_i + b_i T_{i0} - c_i T_{iw}) * Ar_i \qquad (1)$$

wherein $Q_i$ represents the heat flow 306, $T_{i0}$ represents a temperature of a mesh element adjacent to the mesh face 302, $T_{iw}$ represents a temperature of the mesh face 302, and $Ar_i$ represents an area of the mesh face 302. $a_i$, $b_i$, and $c_i$ represent coefficient parameters related to the mesh face 302.

The heat transfer simulation system 104 determines one or more partial heat flows (e.g., the partial heat flows 310, 314, 316 and 312) for the overlapping areas between the face 302 and the faces 301, 303, 304 and 305, and then calculates the heat flow 308 as a sum of the partial heat flows 310 for the overlapping areas. For example, a partial heat flow for an overlapping area is determined as follows:

$$Q_{j,partial} = \frac{A_{j,mapped}}{A_{j,tot\_mapped}} * Q_j \qquad (2)$$

where $Q_{j,\,partial}$ represents the partial heat flow for an overlapping area related to a mesh face j (e.g., the mesh face 301, 303, 304 or 305), $A_{j,\,tot\_mapped}$ represents a total area of the mesh face j, $A_{j,\,mapped}$ represents the overlapping area related to the mesh face j, and $Q_j$ represents an entire heat flow of the mesh face j corresponding to the total area of the mesh face j.

As an example, the mesh faces 303 and 304 overlap completely with the mesh face 302, and the ratio between the overlapping area and the total area for each of the mesh faces 303 and 304 is equal to 1. The mesh faces 301 and 305 overlap partially with the mesh face 302, and the ratio between the overlapping area and the total area for each of the mesh faces 301 and 305 is less than 1. Hence, the partial heat flow and the entire heat flow of the mesh face 303 or the mesh face 304 are the same, and the partial flow of the mesh face 301 or the mesh face 305 is less than the entire heat flow of the particular mesh face.

The heat flow 306 and the heat flow 308 satisfy heat conservation as follows:

$$Q_i + \sum_{j=1}^{N} Q_j = 0 \qquad (3)$$

where $Q_i$ represents the heat flow 306, and $Q_j$ represents a partial heat flow of an overlapping area, N represents the number of the overlapping areas $$\sum_{j=1}^{N} Q_j$$

represents the heat flow 308 which is a sum of the partial heat flows of the overlapping areas, including the contribution of the completely overlapped mesh faces 303 and 304 and the partially overlapped mesh faces 301 and 305.

The heat transfer simulation system 104 determines a temperature of the mesh face 302 as follows:

$$T_{iw} = \frac{\sum_{k=1}^{N+1} a_k + \sum_{k=1}^{N+1} b_k T_{k0}}{\sum_{k=1}^{N+1} c_k} \qquad (4)$$

wherein $T_{k0}$ represents a temperature of a mesh element adjacent to the mesh faces, $T_{iw}$ represents a temperature of the mesh face 302, and $a_k$, $b_k$, and $c_k$ represent coefficient parameters related to the mesh faces.

The heat transfer simulation system 104 determines a linearized equation for the total heat flow as follows:

$$Q_i = A_i + B_i T_{i0} - C_i \sum_{j \neq i}^{N+1} b_j T_{j0} \qquad (5)$$

where $Q_i$ represents the heat flow 306, and $T_{i0}$ and $T_{j0}$ represent temperatures of mesh elements adjacent to the mesh faces. And, $$A_i = (a_i) - \frac{\sum_{k=1}^{N+1} a_k}{\sum_{k=1}^{N+1} c_k}(c_i)$$

$$B_i = (b_i) - \frac{b_i}{\sum_{k=1}^{N+1} c_k}(c_i)$$

$$C_i = \frac{(c_i)}{\sum_{k=1}^{N+1} c_k}$$

where $a_i$, $b_i$, and $c_i$ represent coefficient parameters related to the mesh face 302.

In some embodiments, the heat transfer simulation system 104 implements the equation (5) to assemble diagonal and off-diagonal coefficients and source terms in the coefficient matrix of discretized energy equation as shown below:

$$\begin{array}{c} \ldots \quad j-1 \quad j \quad j+1 \quad \ldots \\ i \begin{bmatrix} \ldots & \ldots & \ldots & \\ C_i b_{j-1} & B_i & C_i b_{j+1} \\ \ldots & \ldots & \ldots & \\ \ldots & \ldots & \ldots & \end{bmatrix} \begin{bmatrix} \ldots \\ T_{i0} \\ \ldots \end{bmatrix} = \begin{bmatrix} \ldots \\ A_i \\ \ldots \end{bmatrix} \end{array} \qquad (6)$$

The assembled diagonal and off-diagonal coefficients and the source terms may be used for heat transfer simulations.

Figure 4:
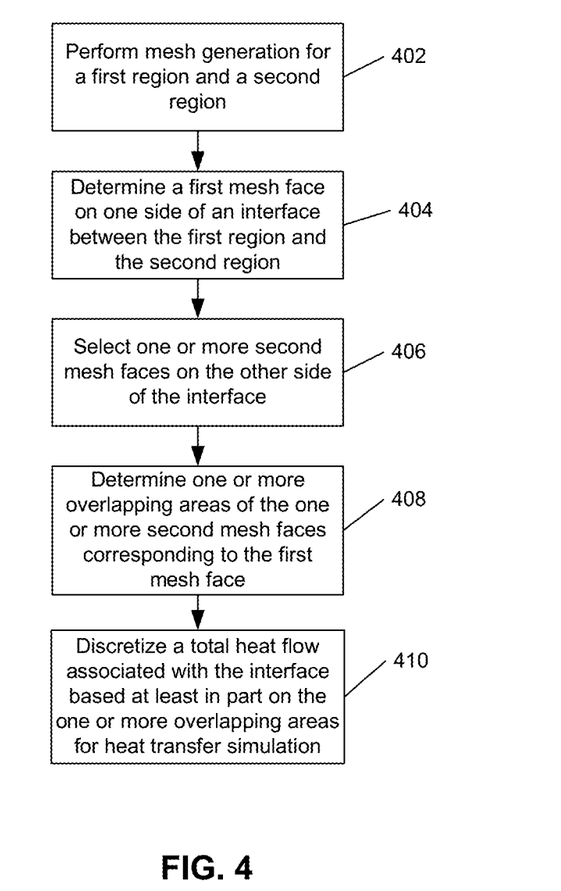
FIG. 4 depicts an example flow chart for heat transfer simulations.

FIG. 4 depicts an example flow chart for heat transfer simulations. At 402, mesh generation is performed for a first region and a second region. For example, the first region and the second region belong to two domains of different physical properties. Non-conformal mesh elements may be generated at an interface between the first region and the second region. At 404, a first mesh face on one side of the interface between the first region and the second region is determined. At 406, one or more second mesh faces on the other side of the interface are determined. The one or more second mesh faces overlap with the first mesh face.

At 408, one or more overlapping areas of the one or more second mesh faces corresponding to the first mesh face are determined. For example, the one or more overlapping areas are stored in a non-transitory computer-readable storage medium. At 410, a total heat flow associated with the interface is discretized based at least in part on the one or more overlapping areas for heat transfer simulations.

Figure 5:
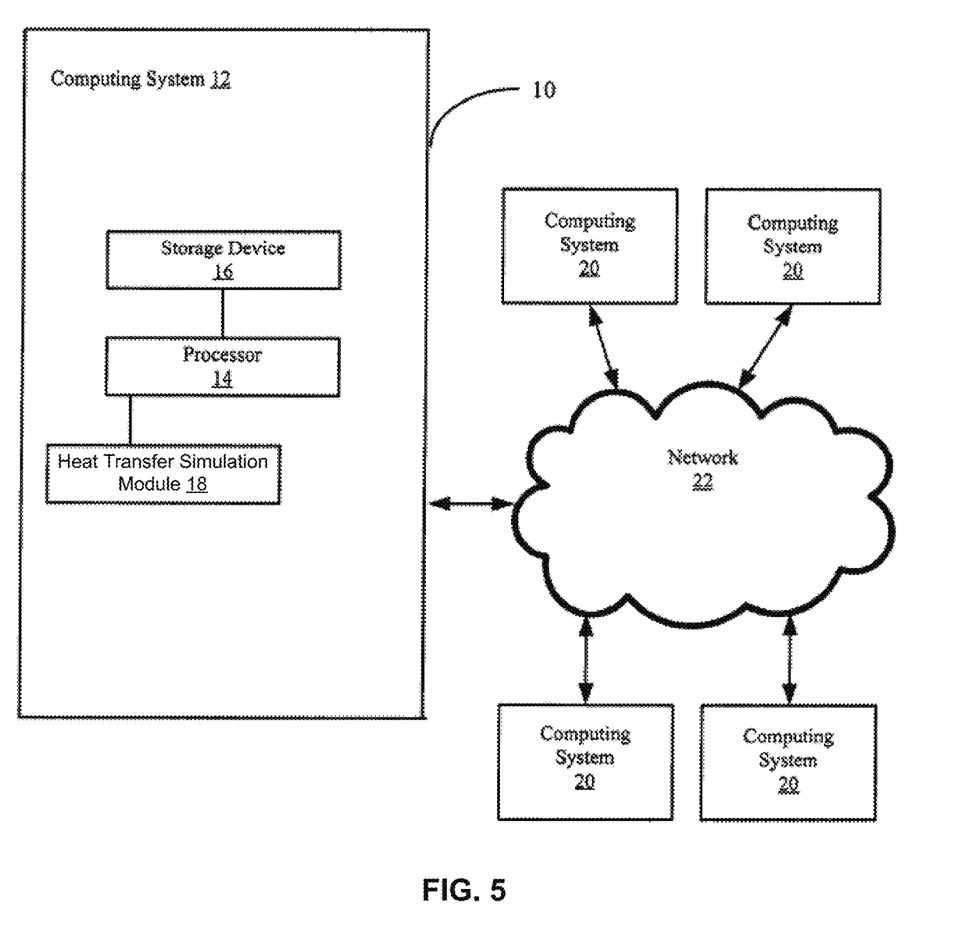
FIG. 5 depicts an example diagram showing a system for heat transfer simulations.

FIG. 5 depicts an example diagram showing a system for heat transfer simulations. As shown in FIG. 5, the system 10 includes a computing system 12 which contains a processor 14, a storage device 16 and a heat transfer simulation module 18. The computing system 12 includes any suitable type of computing device (e.g., a server, a desktop, a laptop, a tablet, a mobile phone, etc.) that includes the processor 14 or provide access to a processor via a network or as part of a cloud based application. The heat transfer simulation module 18 includes tasks and is implemented as part of a user interface module (not shown in FIG. 5).

Figure 6:
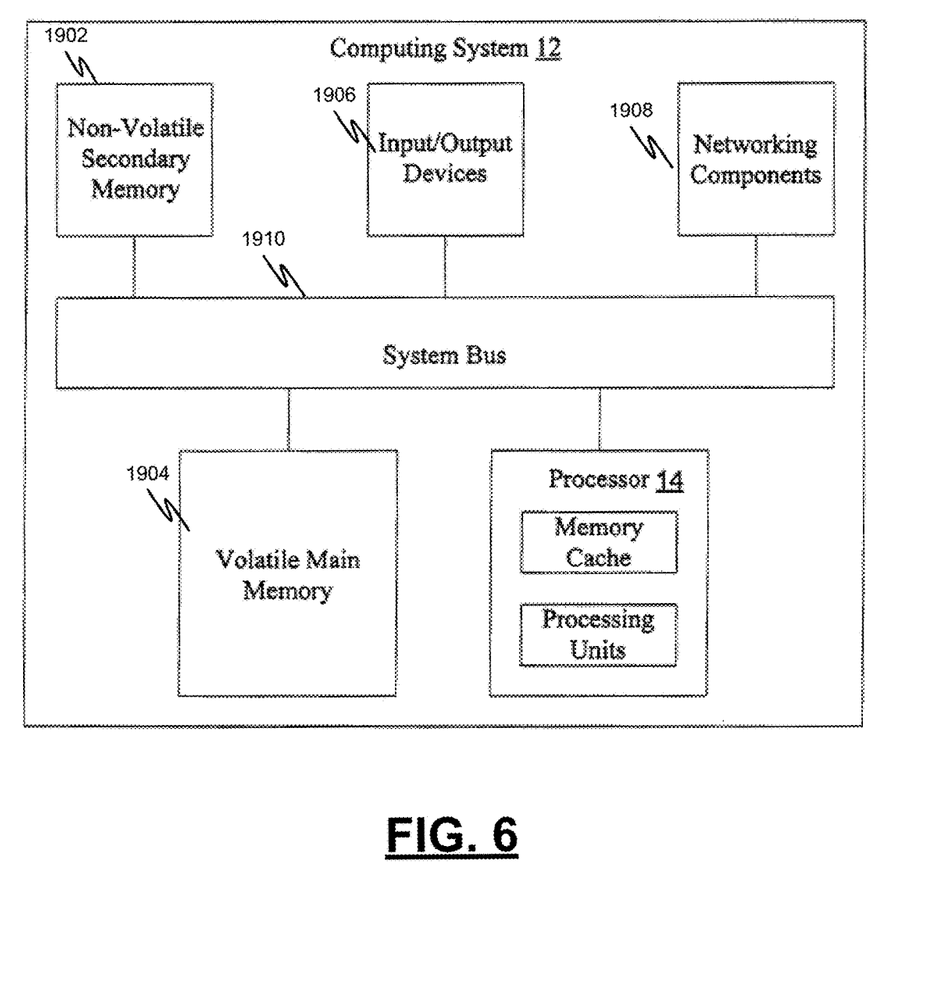
FIG. 6 depicts an example diagram showing a computing system for heat transfer simulations.

FIG. 6 depicts an example diagram showing a computing system for heat transfer simulations. As shown in FIG. 6, the computing system 12 includes a processor 14, memory devices 1902 and 1904, one or more input/output devices 1906, one or more networking components 1908, and a system bus 1910. In some embodiments, the computing system 12 includes the heat transfer simulation module 18, and provides access to the heat transfer simulation module 18 to a user as a stand-alone computer.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

What is claimed:

1. A method for heat transfer simulations for non-conformal interfaces using a thermal coupling algorithm, the method comprising:
   receiving, using one or more data processors, data derived from user input via a graphical user interface initiating a heat transfer simulation;
   performing, using one or more data processors, mesh generation for a first region and a second region;
   determining, using the one or more data processors, a first mesh face on one side of a first interface between the first region and the second region;
   determining, using the one or more data processors, one or more second mesh faces on a second interface, wherein the second interface is on the other side of the first interface, the one or more second mesh faces overlapping with the first mesh face, wherein the first interface and the second interface are each non-conformal;
   determining, using the one or more data processors, one or more overlapping areas of the one or more second mesh faces corresponding to the first mesh face,
   determining, using the one or more data processors, a total heat flow associated with the interface based at least in part on the one or more overlapping areas for heat transfer simulations based on the first heat flow, a temperature of a mesh element adjacent to the first mesh face, a temperature of the first mesh face, an area of the first mesh face, and one or more coefficient parameters related to the first mesh face; and
   providing, using the one or more data processors, the total heat flow to the graphical user interface for display to the user.

2. The method of claim 1, wherein the discretization of the total heat flow associated with the first interface and the second interface includes:
   determining a first heat flow associated with the first mesh face;
   determining a second heat flow associated with the one or more overlapping areas; and
   determining a model for the total heat flow according to heat flow conservation related to the first heat flow and the second heat flow.

3. The method of claim 2, wherein the first heat flow associated with the first mesh face is determined as follows:

$$Q_i = (a_i + b_i T_{i0} - c_i T_{iw}) * Ar_i$$

wherein $Q_i$ represents the first heat flow, $T_{i0}$ represents the temperature of the mesh element adjacent to the first mesh face, $T_{iw}$ represents the temperature of the first mesh face, $Ar_i$ represents the area of the first mesh face, and $a_i$, $b_i$, and $c_i$ represent the one or more coefficient parameters related to the first mesh face.

4. The method of claim 2, wherein the determination of the second heat flow includes:
   determining one or more partial heat flows for the one or more overlapping areas; and
   calculating the second heat flow as a sum of the one or more partial heat flows for the one or more overlapping areas.

5. The method of claim 4, wherein a partial heat flow for an overlapping area is determined as follows:

$$Q_{j,partial} = \frac{A_{j,mapped}}{A_{j,tot\_mapped}} * Q_j$$

where $Q_{j,\,partial}$ represents the partial heat flow for the overlapping area of a second mesh face j, $A_{j,\,tot\_mapped}$ represents a total area of the second mesh face j, $A_{j,\,mapped}$ represents the overlapping area of the second mesh face j, and $Q_j$ represents an entire heat flow of the second mesh face j.

6. The method of claim 2, wherein the first heat flow and the second heat flow satisfy heat conservation as follows:

$$Q_i + \sum_{j=1}^{N} Q_j = 0$$

where $Q_i$ represents the first heat flow, $Q_j$ represents a partial heat flow of an overlapping area, N represents the number of the one or more overlapping areas, and $$\sum_{j=1}^{N} Q_j$$

represents the second heat flow.

7. The method of claim 2, further comprising:
determining a temperature of the first mesh face as follows:

$$T_{iw} = \frac{\sum_{k=1}^{N+1} a_k + \sum_{k=1}^{N+1} b_k T_{k0}}{\sum_{k=1}^{N+1} c_k}$$

wherein $T_{k0}$ represents a temperature of a mesh element adjacent to the mesh faces, $T_{iw}$ represents a temperature of the first mesh face, and $a_k$, $b_k$, and $c_k$ represent coefficient parameters related to the mesh faces.

8. The method of claim 7, wherein the determination of the model for the total heat flow according to heat flow conservation related to the first heat flow and the second heat flow includes:
determining a linearized equation for the first heat flow as follows:

$$Q_i = A_i + B_i T_{i0} - C_i \sum_{j \neq i}^{N+1} b_j T_{j0}$$

where $Q_i$ represents the first heat flow, and $T_{i0}$ and $T_{j0}$ represent temperatures of mesh elements adjacent to the mesh faces, $A_i$, $B_i$ and $C_i$ represent coefficients which are determined as follows:

$$A_i = (a_i) - \frac{\sum_{k=1}^{N+1} a_k}{\sum_{k=1}^{N+1} c_k}(c_i)$$

$$B_i = (b_i) - \frac{b_i}{\sum_{k=1}^{N+1} c_k}(c_i)$$

$$C_i = \frac{(c_i)}{\sum_{k=1}^{N+1} c_k}$$

where $a_i$, $b_i$, and $c_i$ represent coefficient parameters related to the first mesh face.

9. The method of claim 8, further comprising:
computing the coefficients and one or more source terms based at least in part on the linearized equation for the first heat flow.

10. The method of claim 1, wherein the mesh generation for the first region and the second region includes:
generating non-conformal mesh elements for the first region and the second region.

11. A system for heat transfer simulations for non-conformal interfaces using a thermal coupling algorithm, the system comprising:
one or more data processors; and
one or more non-transitory computer-readable storage media encoded with instructions for commanding the one or more data processors to execute operations including:
receiving, by one or more data processors, data derived from user input via a graphical user interface initiating a heat transfer simulation;
performing mesh generation for a first region and a second region;
determining a first mesh face on one side of a first interface between the first region and the second region;
determining one or more second mesh faces on a second interface, wherein the second interface is on the other side of the first interface, the one or more second mesh faces overlapping with the first mesh face, wherein the first interface and the second interface are each non-conformal;
determining one or more overlapping areas of the one or more second mesh faces corresponding to the first mesh face,
determining a total heat flow associated with the interface based at least in part on the one or more overlapping areas for heat transfer simulations based on the first heat flow, a temperature of a mesh element adjacent to the first mesh face, a temperature of the first mesh face, an area of the first mesh face, and one or more coefficient parameters related to the first mesh face; and
providing, using the one or more data processors, the total heat flow to the graphical user interface for display to the user.

12. The system of claim 11, wherein the discretization of the total heat flow associated with the first interface and the second interface includes:
determining a first heat flow associated with the first mesh face;
determining a second heat flow associated with the one or more overlapping areas; and
determining a model for the total heat flow according to heat flow conservation related to the first heat flow and the second heat flow.

13. The system of claim 12, wherein the instructions encoded in the one or more computer-readable storage media are adapted to command the one or more data processors to determine the first heat flow associated with the first mesh face as follows:

$$Q_i = (a_i + b_i T_{i0} - c_i T_{iw}) * Ar_i$$

wherein $Q_i$ represents the first heat flow, $T_{i0}$ represents the temperature of the mesh element adjacent to the first mesh face, $T_{iw}$ represents the temperature of the first mesh face, and $Ar_i$ represents the area of the first mesh face, $a_i$, $b_i$, and $c_i$ represent coefficient parameters related to the first mesh face.

14. The system of claim 12, wherein the determination of the second heat flow includes:
determining one or more partial heat flows for the one or more overlapping areas; and
calculating the second heat flow as a sum of the one or more partial heat flows for the one or more overlapping areas.

15. The system of claim 14, wherein the instructions encoded in the one or more computer-readable storage media are adapted to command the one or more data processors to determine a partial heat flow for an overlapping area as follows:

$$Q_{j,partial} = \frac{A_{j,mapped}}{A_{j,tot\_mapped}} * Q_j$$

where $Q_{j,partial}$ represents the partial heat flow for the overlapping area of a second mesh face j, $A_{j,tot\_mapped}$ represents a total area of the second mesh face j, $A_{j,\,mapped}$ represents the overlapping area of the second mesh face j, and $Q_j$ represents an entire heat flow of the second mesh face j.

16. The system of claim 12, wherein the first heat flow and the second heat flow satisfy heat conservation as follows:

$$Q_i + \sum_{j=1}^{N} Q_j = 0$$

where $Q_i$ represents the first heat flow, $Q_j$ represents a partial heat flow of an overlapping area, N represents the number of the one or more overlapping areas, and $$\sum_{j=1}^{N} Q_j$$

represents the second heat flow.

17. The system of claim 12, wherein the instructions encoded in the one or more computer-readable storage media are adapted to command the one or more data processors to execute further operations including:
determining a temperature of the first mesh face as follows:

$$T_{iw} = \frac{\sum_{k=1}^{N+1} a_k + \sum_{k=1}^{N+1} b_k T_{k0}}{\sum_{k=1}^{N+1} c_k}$$

wherein $T_{k0}$ represents a temperature of a mesh element adjacent to the mesh faces, $T_{iw}$ represents a temperature of the first mesh face, and $a_k$, $b_k$, and $c_k$ represent coefficient parameters related to the mesh faces.

18. The system of claim 17, wherein the determination of the model for the total heat flow according to heat flow conservation related to the first heat flow and the second heat flow includes:
determining a linearized equation for the first heat flow as follows:

$$Q_i = A_i + B_i T_{i0} - C_i \sum_{j \neq i}^{N+1} b_j T_{j0}$$

where $Q_i$ represents the first heat flow, and $T_{i0}$ and $T_{j0}$ represent temperatures of mesh elements adjacent to the mesh faces, $A_i$, $B_i$, and $C_i$ represent coefficients which are determined as follows:

$$A_i = (a_i) - \frac{\sum_{k=1}^{N+1} a_k}{\sum_{k=1}^{N+1} c_k}(c_i)$$

$$B_i = (b_i) - \frac{b_i}{\sum_{k=1}^{N+1} c_k}(c_i)$$

$$C_i = \frac{(c_i)}{\sum_{k=1}^{N+1} c_k}$$

where $a_i$, $b_i$, and $c_i$ represent coefficient parameters related to the first mesh face.

19. A non-transitory machine-readable storage medium encoded with instructions for commanding one or more data processors to execute operations of a method for heat transfer simulations for non-conformal interfaces using a thermal coupling algorithm, the method comprising:
receiving, by one or more data processors, data derived from user input via a graphical user interface initiating a heat transfer simulation;
performing mesh generation for a first region and a second region;
determining a first mesh face on one side of a first interface between the first region and the second region;
determining one or more second mesh faces on a second interface, wherein the second interface is on the other side of the first interface, the one or more second mesh faces overlapping with the first mesh face;
determining one or more overlapping areas of the one or more second mesh faces corresponding to the first mesh face,
determining a total heat flow associated with the interface based at least in part on the one or more overlapping areas for heat transfer simulations based on the first heat flow, a temperature of a mesh element adjacent to the first mesh face, a temperature of the first mesh face, an area of the first mesh face, and one or more coefficient parameters related to the first mesh face; and
providing, using the one or more data processors, the total heat flow to the graphical user interface for display to the user.

* * * * *